United States Patent [19]

Love

[11] 4,053,069
[45] Oct. 11, 1977

[54] APPARATUS FOR LIFTING LARGE BALES OF MATERIAL

[76] Inventor: Phillip Wynell Love, P.O. Box 323, Smithville, Tenn. 37166

[21] Appl. No.: 688,973

[22] Filed: May 24, 1976

[51] Int. Cl.² ................................................ B60P 1/28
[52] U.S. Cl. .......................... 214/147 G; 214/DIG. 4
[58] Field of Search ................. 214/DIG. 4, DIG. 3, 214/501, 505, 506, 651, 652, 653, 672, 147 G, 130 C

[56] References Cited

U.S. PATENT DOCUMENTS

| 1,538,168 | 5/1925 | Cochran | 214/DIG. 4 |
|---|---|---|---|
| 2,724,522 | 11/1955 | Phebus | 214/672 |
| 3,018,906 | 1/1962 | Franklin | 214/505 |
| 3,021,969 | 2/1962 | Peake et al. | 214/505 X |
| 3,877,595 | 4/1975 | Edelman | 214/DIG. 4 |
| 3,880,305 | 4/1975 | Polen | 214/DIG. 4 |
| 3,929,366 | 12/1975 | Keverline | 214/653 X |
| 3,944,095 | 3/1976 | Brown | 214/DIG. 4 |
| 3,946,887 | 3/1976 | Parker | 214/147 G |

Primary Examiner—Albert J. Makay
Attorney, Agent, or Firm—Terry M. Crellin

[57] ABSTRACT

In accordance with this invention, method and apparatus are provided for picking up and moving a large bale of material, such as large, cylindrically shaped bales of hay having diameters up to about 4 to 5 feet and longitudinal lengths up to about 5 or 6 feet. The apparatus includes a mobile chassis and a tilt frame mounted at the end of the chassis for pivotal movement about a substantially horizontal axis extending transversely of the chassis. Means are provided for tilting the tilt frame from a position extending essentially vertically upwardly from the end of the chassis to a position leaning forward towards the front of the chassis. A pair of bale clamping members are pivotally attached to the tilt frame in mutually spaced relationship and means are provided for swinging the bale clamping members toward and away from each other. In picking up and moving a bale, the chassis is moved towards the bale so that the tilt frame is adjacent the lateral side of the bale with the clamping members extending along the mutual ends of the bale. The bale clamping members are swung towards each other to clamp the bale, and then the tilt frame is tilted forward to lift the bale from the ground.

12 Claims, 9 Drawing Figures

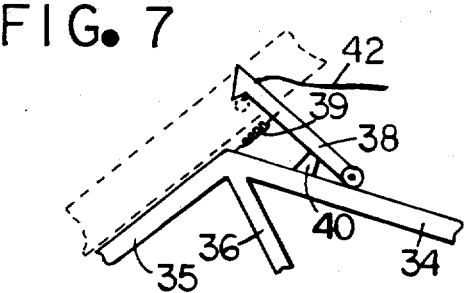
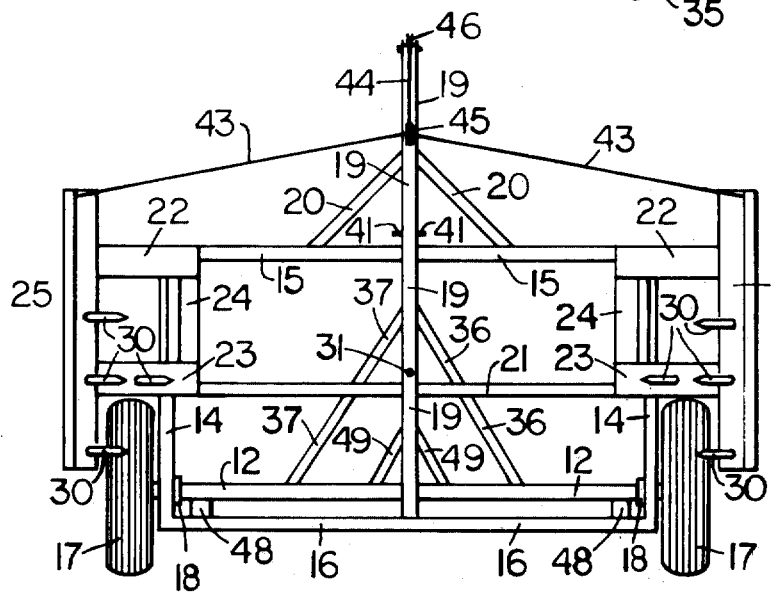
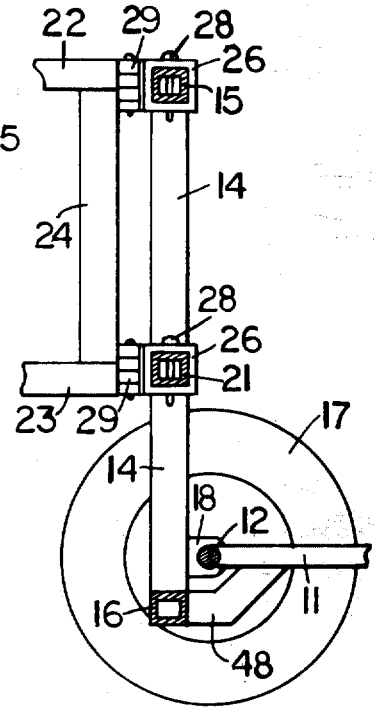
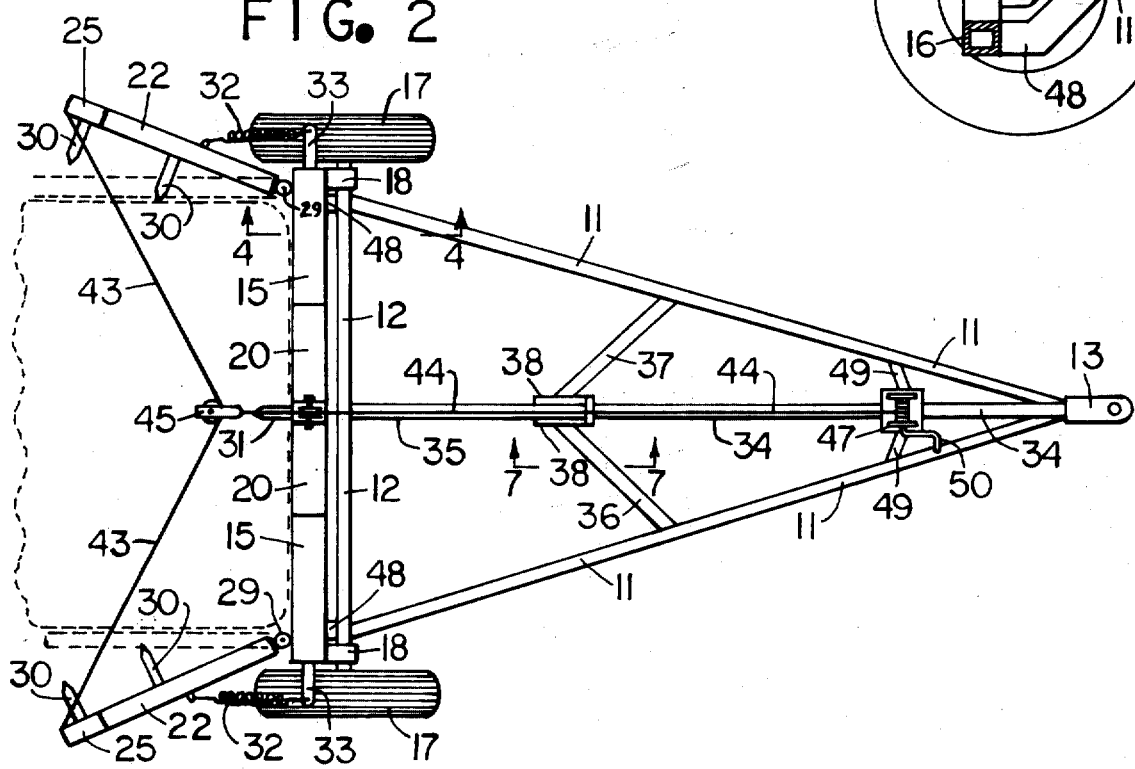

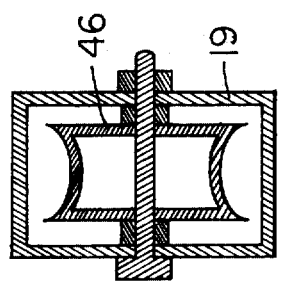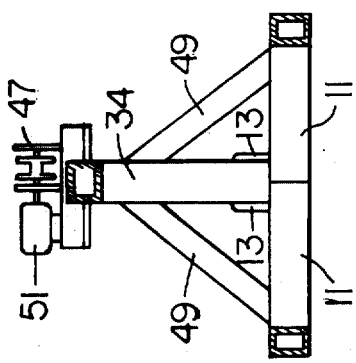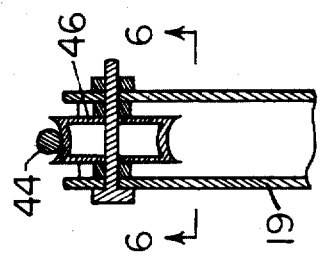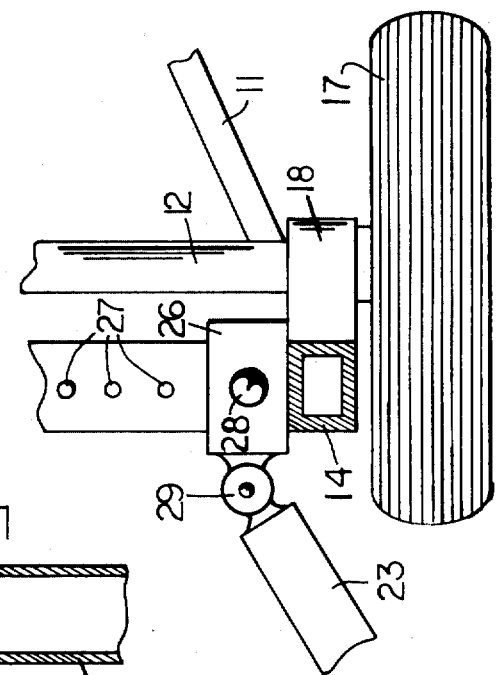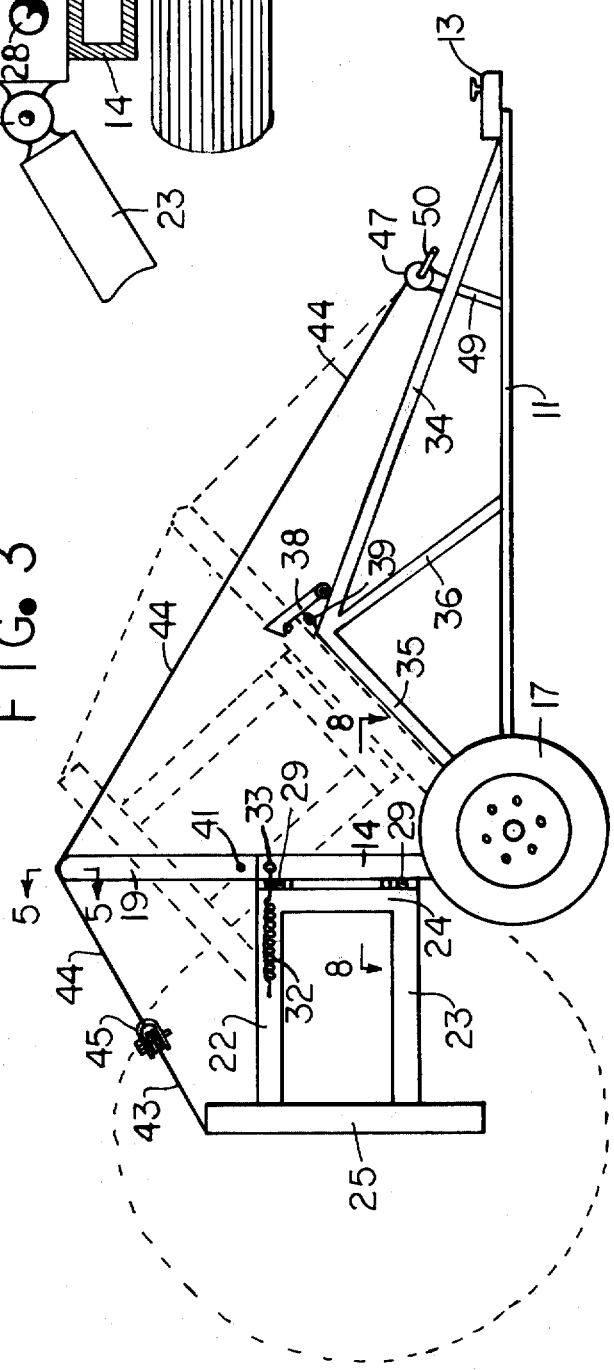

APPARATUS FOR LIFTING LARGE BALES OF MATERIAL

BACKGROUND OF THE INVENTION

1. Field:

The invention relates to picking up and moving large bales of material and to apparatus for accomplishing same.

2. State of the Art

Various equipment is used for handling bales of material. Generally, the apparatus is used in combination with fork lift trucks or the like, and have been used mainly in warehouses. Representative apparatus is shown in U.S. Pat. Nos. 3,334,762 ; 3,876,093; and 3,929,366.

Recently, farm apparatus has been developed for producing large, cylindrical shaped bales of hay. These bales have a diameter of up to about 4 or 5 feet and a length of up to about 5 or 6 feet. There has yet to be developed convenient apparatus for moving the large bales of hay from the field to storage. An object of the present invention is to provide apparatus which is simple and easy to use in picking up and moving large bales of material, such as the large bales of hay.

SUMMARY OF THE INVENTION

The invention provides novel apparatus and procedures for picking up and moving large bales of material, such as big bales of hay having dimensions of up to about 4 or 5 feet by 5 or 6 feet.

The apparatus comprises a mobile chassis having a tilt frame mounted transversely across one of its ends. The tilt frame is adapted for pivotal movement about a substantially horizontal axis extending transversely of the chassis, so that it can be tilted from a position extending essentially vertically upward from the end of the chassis to a position in which it leans forward towards the front of the chassis.

A pair of bale clamping members are pivotally attached to the tilt frame in mutually spaced relationship and swingable toward and away from each other. Preferably, means are provided for adjustably securing the respective bale clamping members to the tilt frame so that the distance between them can be adjusted to correspond to the size of the bale which is to be handled.

Means for moving the bale clamping members inwardly toward each other and outwardly away from each other cooperates with means for tilting the tilt frame, so that when the bale clamping members have been moved into engagement with the bale, the tilt frame swings forward to lift the bale of material from the ground. The mobile apparatus is then moved, as by being pulled by a truck or tractor to where the bale is to be dropped. The tilt frame is swung backward until the bale contacts the ground, and the clamping members are then swung outwardly away from each other to release the bale of material.

The bale clamping members preferably have tines or prongs extending therefrom in confronting relationship so that the tines or prongs are driven into the bale of material as the clamping members make engagement therewith. At least one tine or prong is preferably provided extending from the tilt frame in a direction away from the chassis so that the tine is driven into the bale of material to help support the bale as it is lifted from the ground.

To hold the bale and the tilting frame securely in place during the moving of the apparatus, the chassis of the apparatus is provided with means for providing support for the tilt frame when it is tilted forwards toward the front of the chassis. Such means conveniently comprises a superstructure member mounted on the chassis and adapted to contact the tilt frame as it is tilted towards the front of the chassis. The superstructure is advantageously provided with catch means adapted to be releasably attached to the tilt frame, so that the tilt frame cannot tilt backwards as the bale of material is being moved.

In carrying out the moving of a bale of material, the apparatus is moved so that the tilt frame, in its essentially vertical position, is adjacent the lateral side of the bale of material. The bale clamping members are swung inwardly towards each other to engage the respective ends of the bale of material. The tilt frame is then tilted towards the front of the chassis thereby lifting the bale of material so that the bale can be moved when the mobile apparatus is moved.

THE DRAWINGS

An embodiment representing the best mode presently contemplated of carrying out the invention is illustrated in the accompanying drawings in which:

FIG. 1 is a rear elevation of the apparatus, with the bale clamping members shown in retracted, open position ready for advancing towards a large bale of hay;

FIG. 2, a top plan view of the apparatus shown in FIG. 1, the broken lines indicating the bale clamping members in their closed position engaging a bale of material such as hay;

FIG. 3, a side elevation of the apparatus as shown in the preceeding figures, the broken lines showing the tilt frame tilted forward towards the front of the apparatus, with the bale of material being clamped between the bale clamping members and lifted from the ground so as to be supported by the apparatus;

FIG. 4, a fragmentary, vertical sectional taken along line 4—4 of FIG. 2;

FIG. 5, a fragmentary vertical section taken along line 5—5 of FIG. 3;

FIG. 6, a fragmentary horizontal cross section taken along line 6—6 of FIG. 5;

FIG. 7, a fragmentary vertical section along line 7—7 of FIG. 2, the central upstanding member of the tilt frame being shown by broken lines in tilted position.

FIG. 8, a fragmentary horizontal section along line 8—8 of FIG. 3; and

FIG. 9; a fragmentary vertical section along line 9—9 of FIG. 2, showing an electrically powered winch rather than a manual one.

DETAILED DESCRIPTION OF THE ILLUSTRATED EMBODIMENT

Referring to the drawings, the apparatus of the invention includes a chassis comprising side frame members 11 having one end thereof, respectively, attached adjacent the opposite ends of an axle or shaft 12. The side frame members 11 slant towards each other with the other ends thereof being attached together to form the forward end of the chassis. A hitch mechanism 13 is attached to the forward end of the chassis and is adapted to be connected to corresponding hitch means, such as a ball, on a tractor or truck.

A set of wheels 17 are rotatable attached at the opposite ends of shaft 12, so that the chassis can be moved by being pulled with a motorized vehicle such as a tractor or truck.

A rectangular tilt frame formed by side members 14, top member 15 and bottom member 16 is positioned transversely across the chassis at the rear end thereof and is pivotally mounted to the shaft 12 so that it can be tilted from a position extending essentially vertically upward from the end of the chassis to a position leaning forward towards the front of the chassis. As shown in the drawings, the bottom member 16 of the tilt frame is positioned below and just to the back of the shaft or axle 12. The side members 14 extend upward adjacent the axle 12, and a bearing member 18 is attached to the side members 14 and journaled on the axle 12, so that the side members 14 can pivot about the axle 12.

A central, upstanding member 19 extends from the bottom member 16 of the tilt frame beyond the top member 15. Side bracket members 20 are connected from the top member 15 to the portion of the upstanding member 19 thereby providing stability to the upstanding member 19 as well as the top member 15. Intermediate horizontal members 21 connect the side members 14 with the central upstanding member 19.

A pair of bale clamping members are adjustably attached to the top member 15 and intermediate members 21 so that they can be positioned at the respective sides of the tilt frame and at adjustable distances inwardly from the sides. Each of the bale clamping members comprises a top arm 22 and a bottom arm 23 which are connected together by inner end members 24 and outer end members 25. The outer end members 25 extend both above and below the top and bottom arms 23 and 24.

The bale clamping members are pivotally attached to the tilt frame so that the outer end members 25 thereof can swing towards and away from each other. As shown in FIGS. 4 and 8, coaxial slide members 26 are mounted on the top member 15 and intermediate member 21 of the tilt frame for siding movement therealong. A series of openings 27 in the top member 15 and intermediate members 21 are registrable with an opening in the coaxial slide members 26. A pin 28 engages the registered openings in the slide members 26 and top member 15 and intermediate members 21 of the bale clamping members so that they can be adjustably secured at various positions inwardly of the tilt frame from the ends thereof. Hinges 29 connect the inner end of the bale clamping members to the respective slide members 26. Tines or prongs 30 extend from the bale clamping members in confronting relationship. A tine 31 or plurality of tines can also extend rearwardly from the tilt frame.

The bale clamping members are held, when not engaging a bale of material, in their withdrawn or open position by springs 32, FIGS. 2 and 3, which are attached between the top arm 22 or bottom arm 23 and an extension prong 33 extending outwardly from the side members 14 of the tilt frame. As shown, the springs 32 are attached to the top arm 22 of the bale clamping members.

The chassis is provided with a superstructure which is adapted to strengthen the chassis as well as to provide support for and stabilize the tilt frame as the tilt frame is tilted towards the front of the chassis. As illustrated, the superstructure comprises a pyramidal frame formed by elongate elements 34, 35, 36, and 37 extending from the front, back and two sides of the chassis, respectively. As the tilt frame is tilted forward, the central, upstanding member 19 thereof swings into a position lying alongside the frame element 35 of the superstructure. The tilt frame and bale clamping members are shown in their tilted position by broken lines in FIG. 3. Means are provided for adjustably securing the tilt frame, in its tilted position, to the superstructure of the chassis. As shown in FIGS. 2, 3, and 7, latch arms 38 are pivotally attached to the frame element 34 near one end thereof. A spring 39 pulls the latch arm towards the frame element 34 to abut a stop 40, FIG. 7. The notched ends of the latch arms 38 extend just beyond the intersection of frame elements 34 and 35, and are adapted to engage ears 41 on the upstanding central member 19 of the tilt frame as the tilt frame is tilted towards the front of the chassis. As is best shown in FIG. 1, the ears 41 extend outwardly from the sides of the upstanding, central member 19. Each latch arm 38 engages a corresponding ear 41 on the tilt frame thereby securely holding the tilt frame in contact with the superstructure portion of the chassis. The latch arms 38 can be easily released by pulling a cord or cable 42, FIG. 7.

Means are provided for swinging the bale clamping members toward each other and for tilting the tilt frame towards the front of the chassis once the clamping members have engaged the bale of material which is to be lifted and moved. As illustrated, the means for swinging the bale clamping members and for tilting the tilt frame comprise an elongate, flexible member 43 which connects the upper ends of the outer end members 25 of the bale clamping members. A second elongate, flexible member 44 has one end thereof connected to the first flexible member 43 at a point intermediate its length. As illustrated, the second flexible member 44 is attached to the frame of a pulley 45 which is allowed to center itself in the length of the first flexible member 43. The second flexible member 44 passes over a pulley 46 at the top end of the upwardly standing member 19 of the tilt frame and is then connected to winch means 47 located near the front of the chassis.

As the second flexible member 44 is wound on winch 47, the two bale clamping members are first pulled towards each other. When the bale clamping members engage the bale of material, as is shown by broken lines in FIG. 2, further winding of flexible member 44 on winch 47 tends to lift the outward ends of the bale clamping means and thereby tilt the tilt frame about the axle 12 towards the front of the chassis. As the upwardly standing central member 19 of the tilt frame rotates it approaches the frame member 35 of the superstructure of the chassis. When the member 19 is alongside frame member 35, the latch mechanism 38 engages the ears 41, thereby securely holding the tilt frame in its tilted position. The bale of material was lifted from the ground as the tilt frame rotated and is thus completely supported by the apparatus. The apparatus can then be moved, such as being pulled by a tractor or truck, to where the bale is to be unloaded.

In unloading the bale, the latch mechanism 38 is released by pulling the release cord 42, FIG. 7, and the flexible member 44 is allowed to unwind at a controlled rate from the winch 47. As the flexible member 44 unwinds from winch 47, the tilt frame rotates backward until the bale of material shown by broken lines in FIG. 3 contacts the ground. As the flexible member 44 further continues to unwind from winch 47, the springs 32 pull the ends of the bale clamping members away from each other so as to be disengaged from the bale. The apparatus can then be moved leaving the bale of material where it is. To prevent the tilt frame from continuing to rotate backwards after the bale clamping members have been disengaged from the bale of material, a stop 48, FIG. 4, is provided. As shown, the stops 48 are attached to each of the chassis elements 11 adjacent the axle 12. The stops 48 extend under the axle and make contact with the side members of the tilt frame, thereby preventing the tilt frame from tilting backwards from the chassis. Instead of the stops 48, chains or other flexible members could be attached from the chassis to the tilt frame, thus preventing the tilt frame from tilting backwards from the chassis.

As illustrated, the wheels 17 are mounted on axle 12, and axle 12 also forms the pivot axis of the tilt frame. It should be recognized however, that the pivot axis of the tilt frame need not be coaxial with the axle upon which the wheels 17 are mounted.

The winch means 47 is mounted on the frame member 34 of the superstructure of the chassis. As shown, reinforcement members are connected between the frame member 34 and the side frame members 11 of the chassis to provide support for the winch means 47. The winch means 47 can be of the manually operated type having a crank handle 50, as shown in FIGS. 2 and 3, or it can be mechanically operated, such as by a motor means 51 shown in FIG. 9. The motor means can, of course, be driven electrically or pneumatically.

It should be recognized that various modifications can be made to the apparatus shown in the drawings without departing from the novel aspects of the invention as particularly pointed out in the claims. For example, hydraulic or electric motors or rams could be used to swing the bale clamping members towards and away from each other as well as tilting the tilt frame. Various type latching means, which are well known in the art, could be used in place of the illustrated latching means 38. Further, the bale clamping members need not be adjustably secured to the tilt frame, but could be integrally attached at the respective sides thereof if it is conceived that bales of uniform lengths will be handled. The adjustable nature of the bale clamping members as illustrated is preferred because they can be adjusted to handle bales of various sizes. The flexible members 43 and 44 can be rope, chain, metal cable, etc., and the invention is not to be restricted to any one type of such flexible members. The structural elements are preferably made of steel or other metal, but at least various of the structural elements or members, could be made of wood.

I claim:

1. Apparatus for picking up and moving a large bale of material, such as a bale of hay, comprising, a mobile chassis mounted on at least one set of wheels; a generally vertically extending tilt frame extending transversely across the chassis at an end thereof and being mounted at one end to the end of the chassis for pivotal movement about an essentially horizontal axis extending transversely of the chassis, so that the tilt frame can be tilted from a position extending essentially vertically upward from the end of the chassis to a position in which the tilt frame leans forward towards the front of the chassis; a pair of rearwardly extending bale clamping members pivotally attached intermediate the tilt frame in mutually spaced relationship and swingable toward and away from each other; means for tilting the tilt frame forward towards the front of the chassis and for swinging the bale clamping members toward each other to clamp a bale, said means for tilting the tilt frame and for swinging the bale clamping members comprising an elongate, flexible member having its ends connected to the free ends of the rearwardly extending bale clamping members a second, elongate, flexible member having one end thereof attached to the first flexible member at a point intermediate its length, said second flexible member passing over means secured to the top of the tilt frame and being connected to winch means at the front of the chassis for pulling said second, flexible member towards the front of the chassis.

2. Apparatus in accordance with claim 1, wherein the chassis is provided with means for providing support for the tilt frame when it is tilted forward towards the front of the chassis.

3. Apparatus in accordance with claim 2, wherein the means for providing support for the tilt frame comprises a superstructure member mounted on the chassis and adapted to contact the tilt frame as it is tilted towards the front of the chassis.

4. Apparatus in accordance with claim 3, wherein the superstructure member comprises a pyramidal frame formed by elongate elements extending from the front, back and two sides of the chassis and being connected together at a point above the chassis intermediate the sides of the chassis and between the front and end of the chassis, so that the tilt frame contacts the pyramidal frame as it is tilted towards the front of the chassis.

5. Apparatus in accordance with claim 3, wherein the superstructure member is provided with a releasable catch means adapted to be releasably attached to the tilt frame as the tilt frame is tilted towards the front of the chassis.

6. Apparatus in accordance with claim 1, wherein the second elongate, flexible member is a cord or rope and it passes over pulley means located at the top of the tilt frame intermediate the ends of the tilt frame.

7. Apparatus in accordance with claim 1, wherein the winch means is hand operated.

8. Apparatus in accordance with claim 1, wherein the winch means is driven by motor means.

9. Apparatus in accordance with claim 1, wherein means are provided for adjustably securing the respective bale clamping members to the tilt frame at the ends thereof and at adjustable distances inwardly from the ends.

10. Apparatus in accordance with claim 1, wherein the bale clamping members have tines extending therefrom in confronting relationship, and the tilt frame has at least one tine extending therefrom in a direction away from the chassis.

11. Apparatus in accordance with claim 1, wherein the set of wheels is rotatively mounted to the chassis on an axis which is coaxial with the pivot axis of the tilt frame.

12. Apparatus in accordance with claim 11, wherein the front of the chassis is provided with hitch means so that the chassis can be attached to a motive vehicle.

* * * * *